July 21, 1931.  F. A. BOWLING  1,815,758
AIRCRAFT
Filed Oct. 17, 1930    6 Sheets-Sheet 5
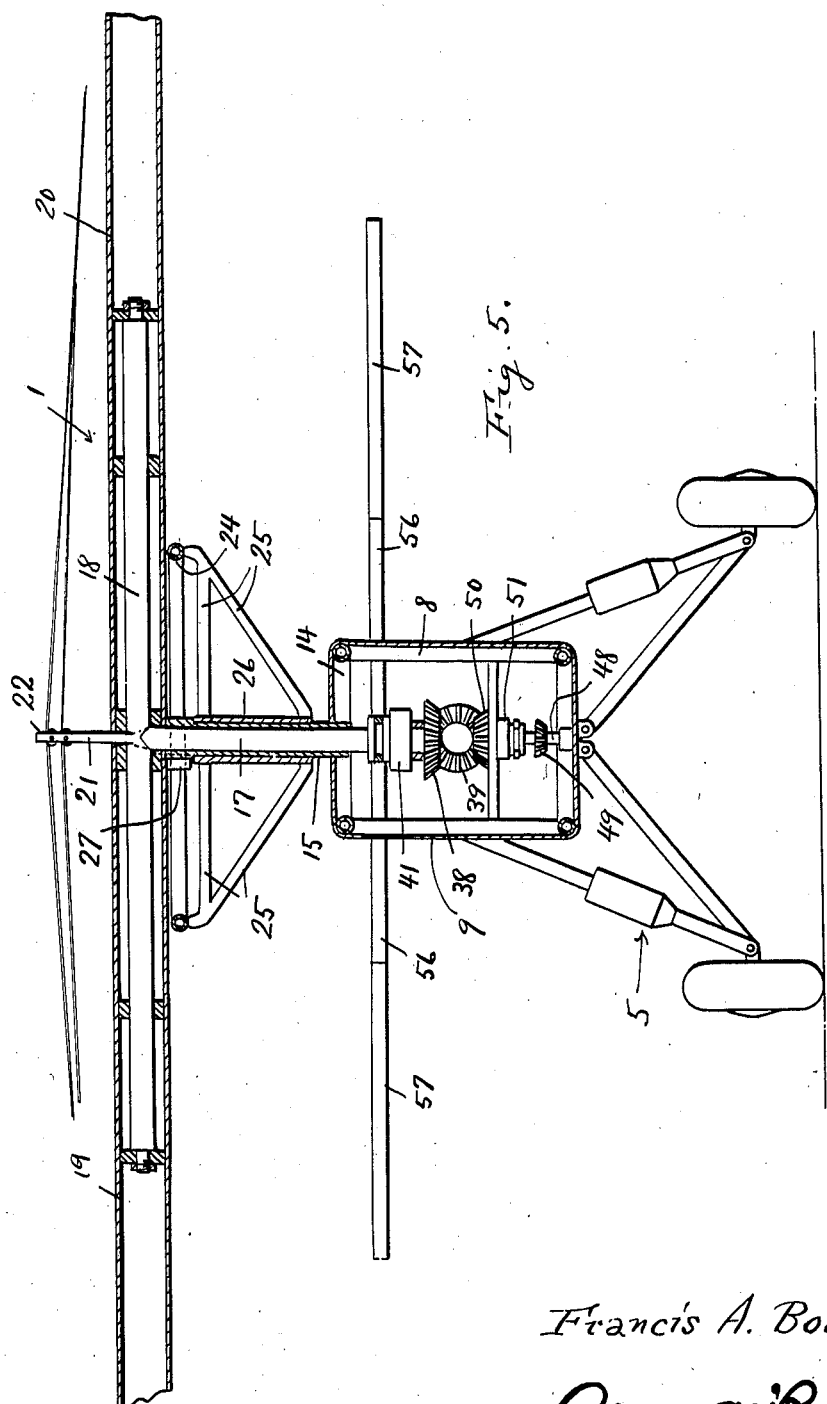
Inventor
Francis A. Bowling
By Clarence A. O'Brien
Attorney July 21, 1931.  F. A. BOWLING  1,815,758
AIRCRAFT
Filed Oct. 17, 1930   6 Sheets-Sheet 6
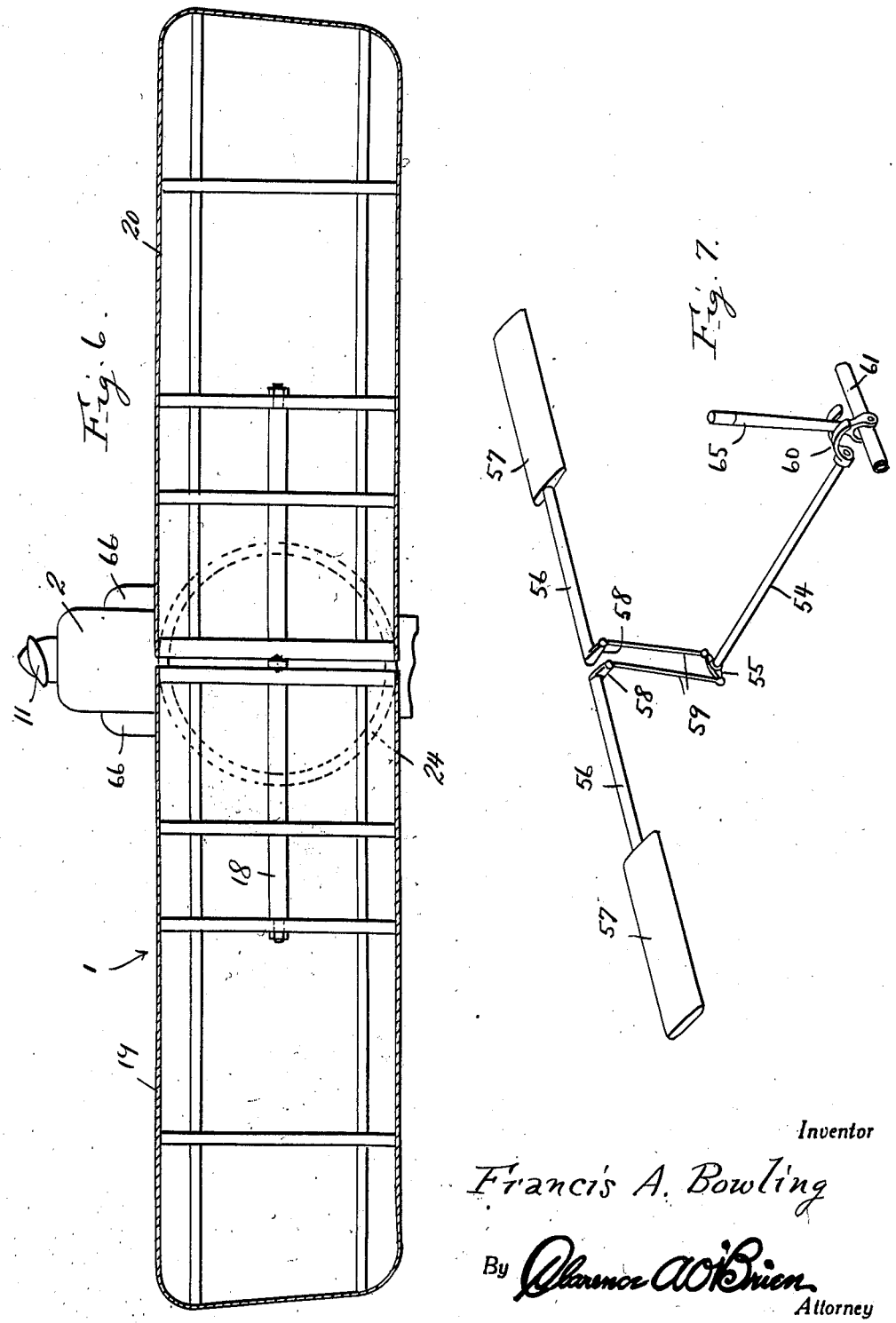
Inventor
Francis A. Bowling
By Clarence A. O'Brien
Attorney Patented July 21, 1931

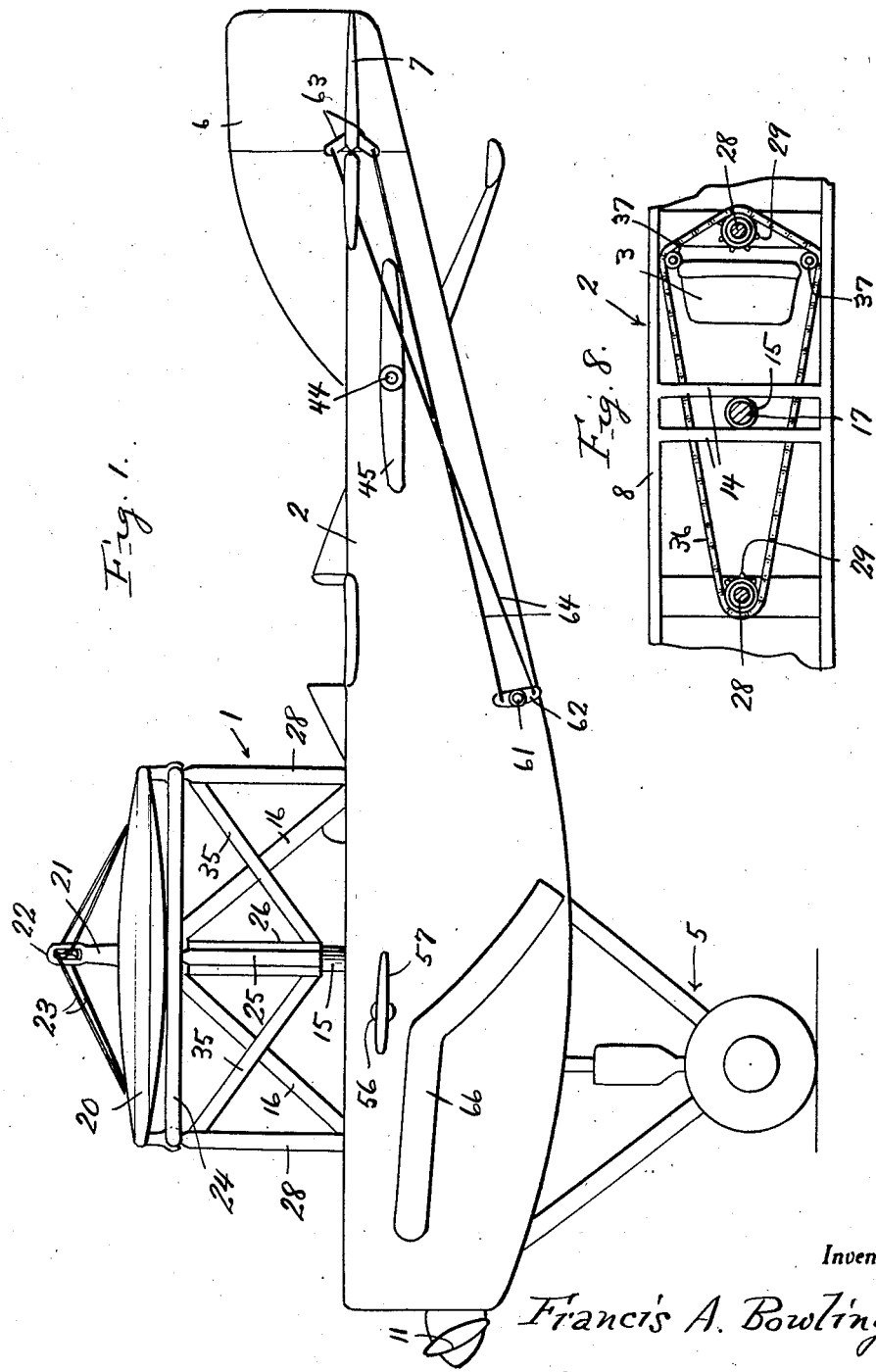

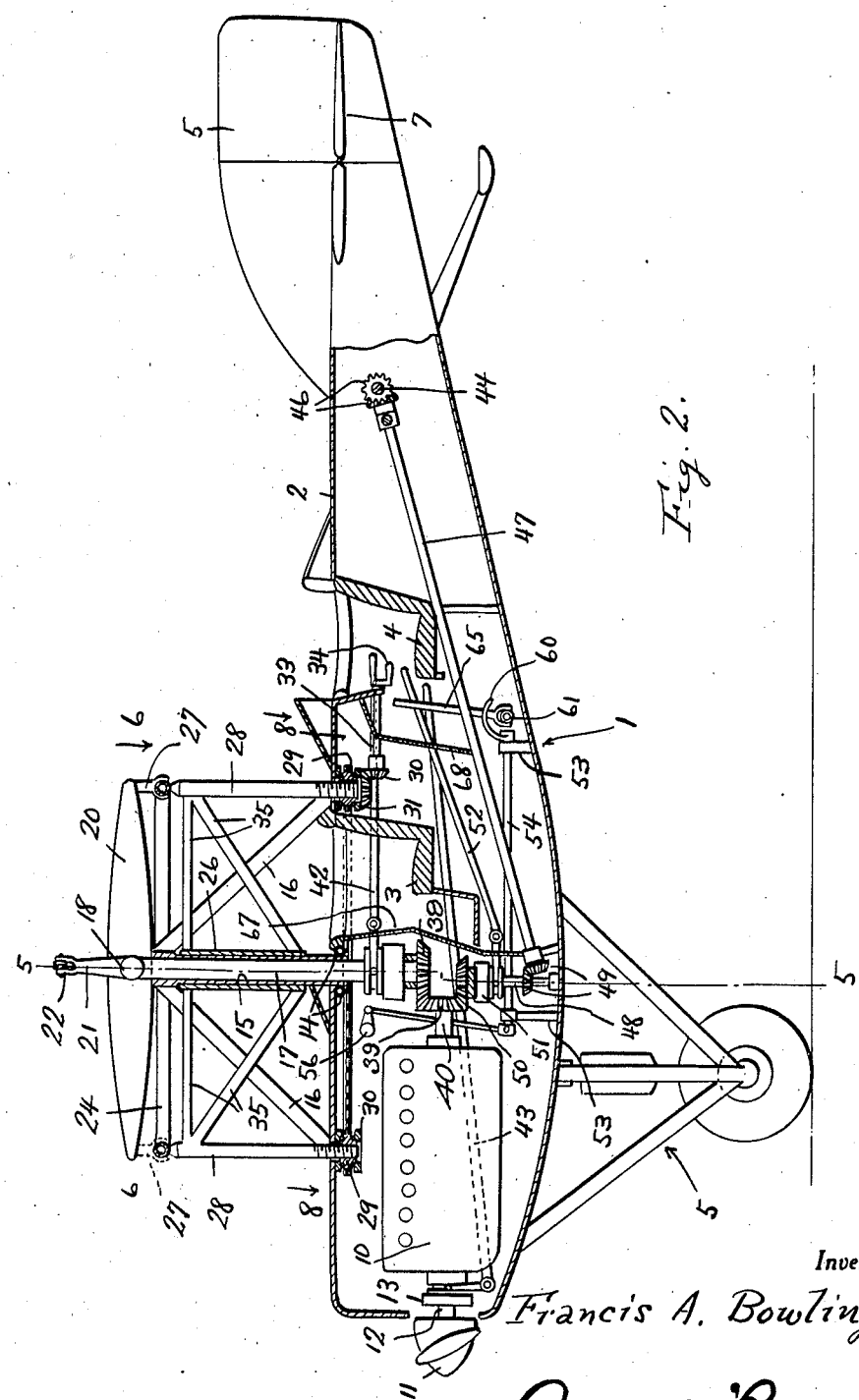

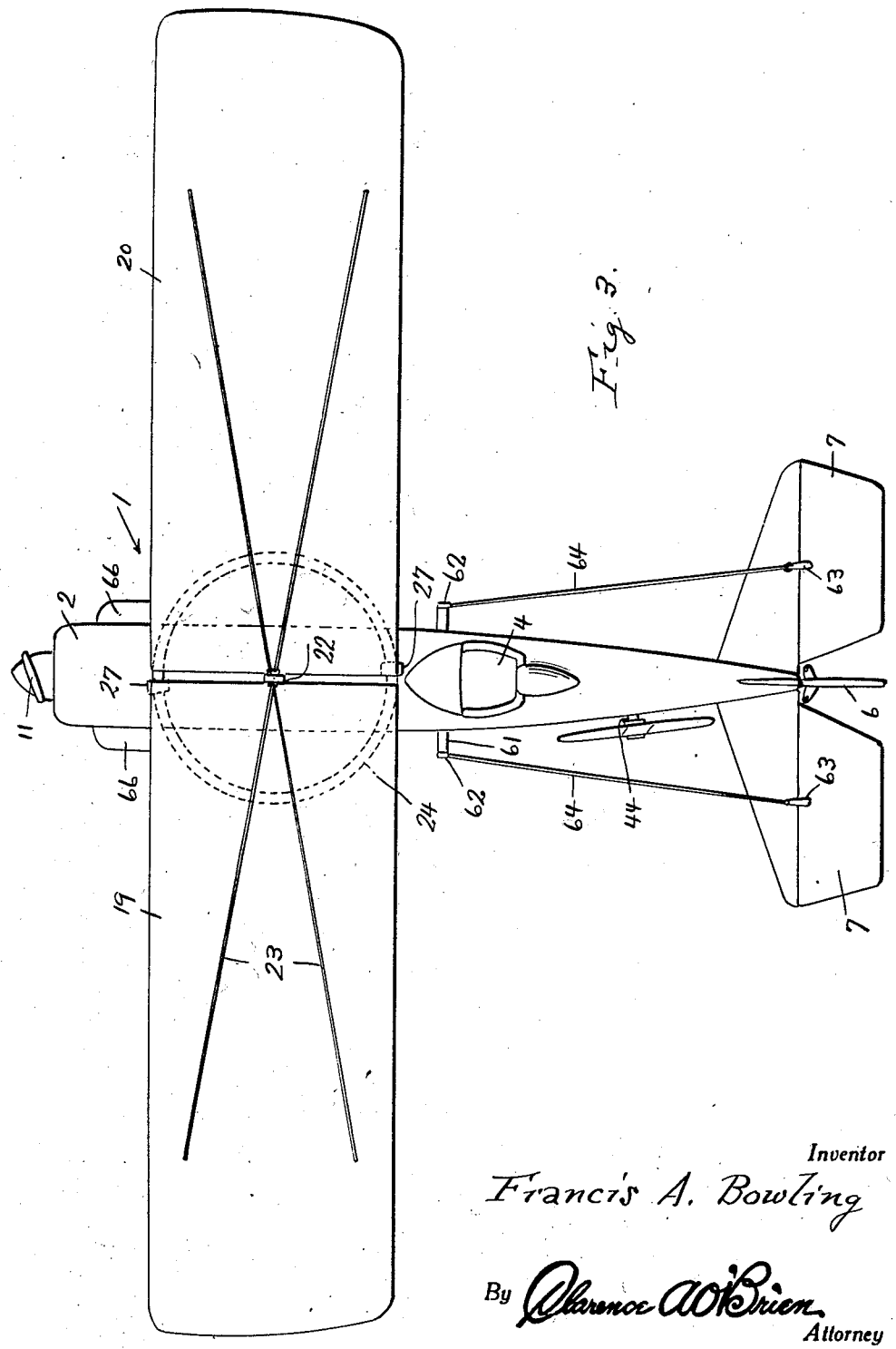

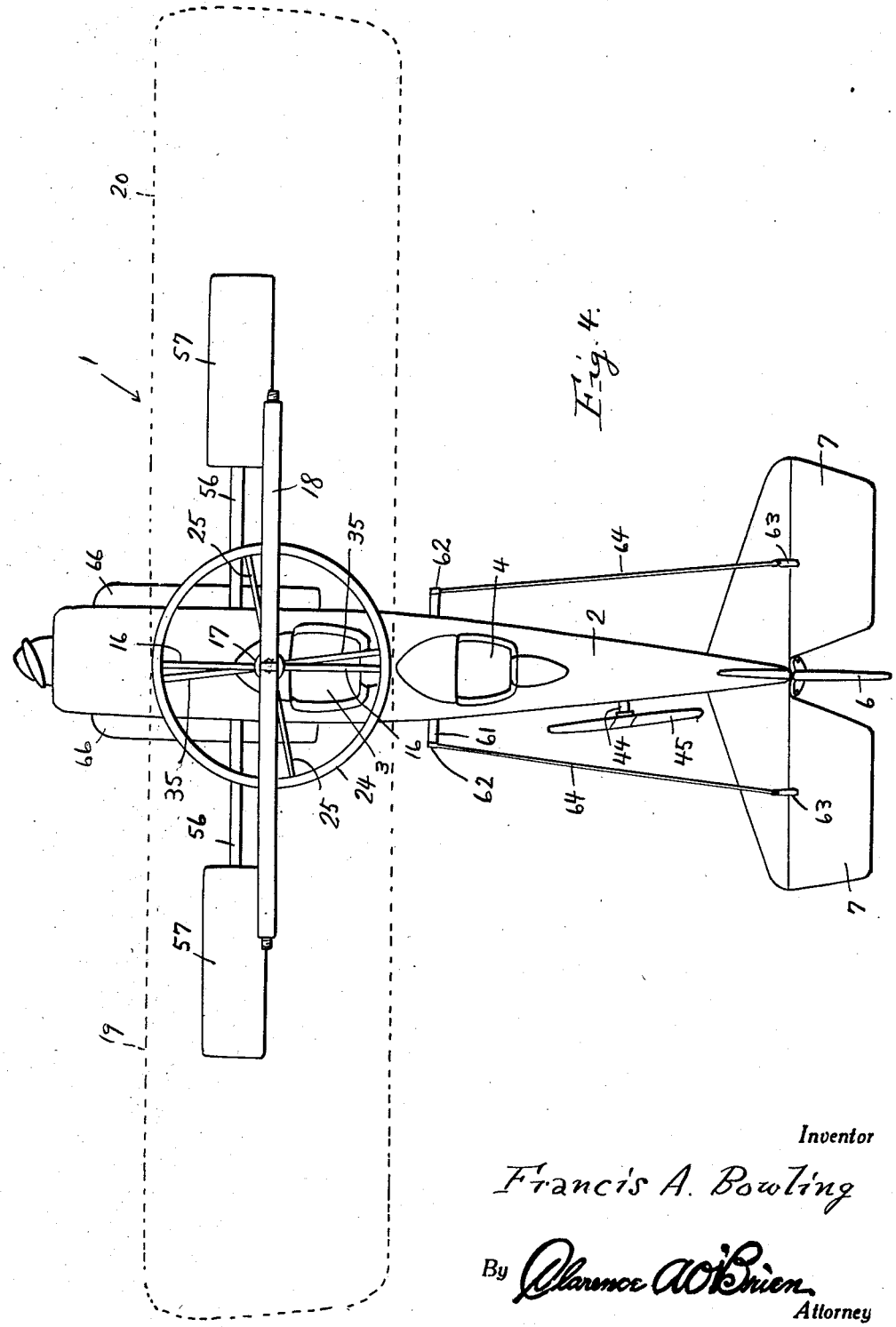

1,815,758

UNITED STATES PATENT OFFICE

FRANCIS A. BOWLING, OF GETTYSBURG, PENNSYLVANIA

AIRCRAFT

Application filed October 17, 1930. Serial No. 489,449.

This invention relates to aircrafts of the heavier than air power driven type and has for its primary object to provide, in a manner as hereinafter set forth, an aircraft embodying a novel construction and arrangement of parts whereby a combined aeroplane and helicopter is provided.

Another important object of the invention is to provide an aircraft of the aforementioned character which is adapted to ascend vertically to the desired altitude and which then may be caused to travel forwardly or horizontally in the manner of a conventional aeroplane.

Another important object of the invention is to provide an aircraft of the character described which is adapted to descend in a vertical plane and at any desired speed, thus enabling the aircraft to be landed in a comparatively restricted area.

Other objects of the invention are to provide an aircraft which will be simple in construction, strong, durable, efficient and reliable in operation and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1 is a view in side elevation of an aircraft constructed in accordance with this invention.

Figure 2 is a view principally in vertical longitudinal section through the aircraft.

Figure 3 is a top plan view of the aircraft.

Figure 4 is a view in top plan of the aircraft showing the means for adjustably and rotatably supporting the sections of the wings, said sections being indicated in broken lines.

Figure 5 is a vertical cross sectional view taken substantially on the line 5—5 of Figure 2 looking forwardly.

Figure 6 is a horizontal sectional view taken substantially on the line 6—6 of Figure 2 looking in the direction indicated by the arrows.

Figure 7 is a detail perspective view of the ailerons and the operating mechanism therefor.

Figure 8 is a horizontal sectional view taken substantially on the line 8—8 of Figure 2 looking in the direction indicated by the arrows.

Referring to the drawings in detail, it will be seen that the reference numeral 1 designates the aircraft constituting this invention, said aircraft including a fuselage 2 having spaced longitudinally therein the seats 3 and 4 and being mounted on the landing gear 5. The usual rudder 6 and the elevators 7 are operatively mounted on the rear end portion of the fuselage 2. The fuselage 2 comprises a skeleton frame 8 of approved construction having the covering 9 thereon. An engine 10 is mounted in the forward portion of the fuselage and is adapted to be operatively connected to a propeller 11 which is mounted on the shaft 12 through the medium of a clutch device 13.

Spaced, parallel, tubular bars 14 extend transversely between the upper longitudinal members of the fuselage frame 8 and rigidly secured centrally therebetween by suitable means such as welding is an upstanding tubular housing 15 which projects a considerable distance above the fuselage 2. A vertical shaft 17 is rotatably mounted in the tubular housing 15 and said shaft 17 extends above and below the ends of the housing 15. Braces for the tubular housing 15 are designated by the reference numeral 16 and extend between the upper end portion of said housing 15 and the frame 8 of the fuselage 2. A shaft 18 is rigidly mounted on the upper portion of the shaft 17, the shaft 18 being horizontally disposed and having its intermediate portion connected to the vertical shaft 17. Wing sections 19 and 20 are mounted for rocking movement on the horizontal shaft 18 on opposite sides of the vertical shaft 17. An extension 21 projects outwardly from an intermediate portion of the horizontal shaft 18 between the wing sections 19 and 20, and has its upper end formed to provide an eye 22 in which are journaled pulleys over which the crossed bracing cables or wires are trained, said brace cables or wires being designated by the reference numeral 23 and having one end connected to one of the wing sections forwardly of the axis of said one wing section and their other ends connected to the other wing section rearwardly of the axis of said other wing section. It will thus be seen that when one of the wing sections is rocked in one direction the other wing section will be rocked in the opposite direction simultaneously.

A tubular annulus 24 is mounted for vertical adjustment beneath the wing sections 19 and 20 through the medium of the supporting frame 25 which is mounted on a sleeve 26 which, in turn, is slidably mounted on the tubular standard 15. Yokes 27 depend from the inner ends and from the opposite sides of the wing sections 19 and 20 and slidably embrace the tubular annulus 24 in a manner to permit rotation of the wing sections in a horizontal plane independently of the annulus. Screw shafts 28 depend from diametrically opposite sides of the tubular annulus 24 and have their lower ends threaded through sprocket wheels 29 which are rotatably mounted in suitable supporting bearings 30 in the fuselage 2. The rearmost screw shaft 28 extends below its respective sprocket wheel and has fixed thereon a beveled gear 31 which is in mesh with a beveled gear 32 which is fixed upon a shaft 33 having a hand crank 34 thereon within convenient reach of an operator or pilot in the seat 4. Braces 35 extend between the screw shafts 28 and the sleeve 26 for lending rigidity to the screw shafts. As best seen in Figure 8 of the drawings, an endless sprocket chain 36 operatively connects the sprocket wheels 29 of the screw shafts 28 together, the sprocket chain 36 being trained around opposite sides of the seat 3 on the guide pulleys 37.

A beveled gear 38 is loosely mounted on the lower end portion of the vertical shaft 17 and is in mesh with a beveled gear 39 which is fixed on the engine shaft 40, said shaft 40 extending rearwardly from the engine 10. A suitable clutch device 41 operatively connects the gear 38 to the vertical shaft 17, said clutch device 41 being manually operable from the seat 4 through the medium of the pivoted lever 42 which is mounted for swinging movement in a vertical plane and has its forward yoke for engagement with the clutch device 41. The lever 42 may extend on one side of the seat 3 and has its forward end portion laterally offset for engagement with the clutch 41 which is disposed in the longitudinal center of the fuselage 2 of the aircraft. The clutch device 13 which operatively connects the propeller shaft 12 to the engine 10 is operable manually from the seat 4 through the medium of an elongated lever 43 which is operatively connected with the clutch device 13.

Extending transversely through the left vertical wall of a rear portion of the fuselage 2 is a shaft 44 having fixed on its outer end a propeller 45. Beveled gears 46 operatively connect a shaft 47 to the shaft 44 and the shaft 47 has its forward end operatively connected to a vertical shaft 48 by beveled gears 49. A beveled gear 50 is loose on the upper end portion of the vertical shaft 48 and is in mesh with the gear 39 on the engine shaft 40. The gear 50 is operatively connected to the vertical shaft 48 by a suitable clutch device 51 which is manually operable from the seat 4 through the medium of a pivoted lever 52. The lever 52 extends under the seat 3 and is pivotally mounted for swinging movement in a vertical plane and has its forward end provided with a yoke for operative engagement with the clutch device 51.

Vertical brackets 53 are mounted at longitudinally spaced points in the fuselage 1 and journaled in said brackets is a horizontal, longitudinally extending rock shaft 54 which, as best seen in Figure 7 of the drawings, has fixed on its forward end a cross head 55. Shafts 56 are journaled in the vertical sides of the fuselage 2 and extend outwardly from the fuselage and have fixed on their outer end portions the ailerons or control surfaces or devices 57. Arms 58 are fixed to the inner ends of the shafts 56 and are connected to the opposite ends of the cross head 55 by the rods 59. An arcuate fork 60 is fixed on the rear end portion of the rocker shaft 54. A rocker shaft 61 is journaled transversely in the fuselage 2 of the aircraft 1 and projects beyond the opposite sides of the fuselage and has fixed on its opposite end portions the cross heads 62 which are operatively connected to the arms 63 which extend upwardly and downwardly from the upper and lower sides of the elevators 7 by the crossed wires 64. An operating lever 65 is pivotally mounted for swinging movement in a vertical plane on an intermediate portion of the rocker shaft 1 within the fuselage 2 and said lever is operatively engaged between the tines of the fork 60. It will thus be seen that when the lever 65 is swung laterally on the rocker shaft 61 the rocker 54 will be rocked through the medium of the fork 60 and when the lever 65 is swung longitudinally of the fuselage 2 the rocker shaft 61 only will be actuated to shift the elevators 7. As will be apparent, when the rocker shaft 54 is actuated, the ailerons 57 are moved.

In Figure 1 of the drawings the reference numeral 66 designates an exhaust pipe, one of which is provided on each side of the fuselage, as seen in certain of the remaining figures. A transparent dash or panel 67 is mounted in front of the seat 3 and a transparent dash or panel 68 is mounted in front of the seat 4. The transparent panels permit the mechanism in the fuselage to be viewed from the seats 3 and 4 when it is so desired.

In operation, when the aircraft is to take off, the lever 43 is shifted to disengage the clutch device 13 to disconnect the propeller shaft 12 from the engine 10, it being understood, of course, that the engine 10 is operated. The hand crank 34 is then rotated to rotate the sprocket wheels 29 through the medium of the gear 31 which is fixed to the rearmost of the sprocket wheels and is meshed with the gear 32 on the shaft 33. As before explained, the sprocket wheels 29 are operatively connected for rotation in unison by the endless sprocket chain 36. When the members 28 are threaded downwardly by the sprocket wheels 29, the tubular annulus 24 is lowered and the wing sections 19 and 20 are rocked in opposite directions on the horizontal shaft 18 through the medium of the yokes 27 which are slidably engaged with the tubular annulus 24. In this manner the wing sections 19 and 20 are converted to propeller blades and the lever 42 is then actuated from the seat 4 in a manner to shift the clutch device 41 and operatively connect the beveled gear 39 to the vertical shaft 17 for operatively connecting said shaft 17 to the engine 10 for actuation by said engine. This, of course, rotates the wing sections 19 and 20 in a horizontal plane for causing the aircraft to rise in a vertical plane. The lever 52 is then actuated to shift the clutch device 51 for operatively connecting the beveled gear 50 to the shaft 48 and, as will be apparent, the propeller 45 is thus operatively connected to the engine 10 for actuation by said engine to resist any tendency of the fuselage 2 to rotate with the helicopter propeller which is provided by the wing sections 19 and 20. When the desired altitude is reached the tubular annulus 24 is moved upwardly to gradually return the wing sections 19 and 20 to their original position and the clutch device 13 is shifted to operatively connect the propeller 11 with the engine 10. The clutch device 41 is then shifted to inoperative position to disconnect the vertical shaft 17 from the engine 10 and the clutch device 51 is also shifted to disconnect the propeller 45 from the engine 10. The aircraft is then ready to travel forwardly as a conventional aeroplane. This operation of changing from vertical to horizontal movement may be facilitated by nosing the aircraft over into a dive in order to attain flying speed rapidly.

It is believed that the many advantages of an aircraft constructed in accordance with this invention will be readily understood, and although the preferred embodiment of the invention is as illustrated and described, it is to be understood that changes in the details of construction may be had which will fall within the scope of the invention as claimed.

What is claimed is:—

1. An aircraft of the character described including a fuselage having an engine mounted therein, a vertical rotary shaft extending outwardly from the fuselage, horizontally disposed wing sections supported for rocking movement on the vertical shaft, means for operatively coupling the vertical shaft to the engine for actuation by said engine, and manually operable means for simultaneously rocking the wing sections in opposite directions, said means comprising an annulus mounted for vertical movement on the fuselage, yokes depending from the forward and rearward sides of the inner ends of the wing sections and slidably connected to the annulus for traveling therearound, internally threaded sprocket wheels rotatably mounted on the fuselage, an endless sprocket chain operatively connecting the sprocket wheels together for rotation in unison, screw shafts depending from the annulus and threaded through the sprocket wheels, and a drive shaft operatively connecting with one of the sprocket wheels for actuating said one sprocket wheel.

2. An aircraft of the character described including a fuselage having an engine mounted therein, a tubular standard fixed on the fuselage and extending upwardly therefrom, a vertical shaft mounted in the tubular standard for rotation therein and extending above and below the upper and lower ends thereof, a horizontal shaft having an intermediate portion fixed on the vertical shaft in spaced relation above the fuselage for rotation with the vertical shaft in a horizontal plane, wing sections mounted for rocking movement on the horizontal shaft on opposite sides of the vertical shaft, means for operatively connecting the vertical shaft to the engine for actuation by said engine, and means for simultaneously rocking the wing sections in opposite directions on the horizontal shafts, said means comprising a sleeve mounted for vertical sliding movement on the tubular standard above the fuselage, an annulus rigidly mounted on the sleeve and disposed horizontally beneath the wing sections, internally threaded gear wheels rotatably mounted in the fuselage, screw shafts fixed to the annulus and depending therefrom and threaded through the sprocket wheels, a gear fixed on one of the sprocket wheels, a shaft rotatably mounted in the fuselage, a gear fixed on one end of the last named shaft in mesh with the first named gear, a hand crank fixed on the other end of the last named shaft for manually rotating said last named shaft, and an endless sprocket chain operatively connecting the sprocket wheels together for rotation in unison, and means connecting the adjacent end portions of the wing sections to substantially diametrically opposite sides of the annulus, said means being slidably engaged with the annulus for traveling therearound.

In testimony whereof I affix my signature.

FRANCIS A. BOWLING.